United States Patent Office 3,832,170
Patented Aug. 27, 1974

3,832,170

METHOD AND APPARATUS FOR ELECTRONIC COLOR PHOTOGRAPHY AND PHOTOSENSITIVE MEMBER USED FOR THE SAME

Katsumi Nagamatsu, and Takashi Saito, Tokyo, Japan, assignors to Canon Kabushiki Kaisha, Tokyo, Japan Filed Apr. 1, 1970, Ser. No. 24,734
Int. Cl. G03g 5/04, 13/22
U.S. Cl. 96—1.2 14 Claims

ABSTRACT OF THE DISCLOSURE

The photosensitive member consists basically of a supporting base, a photoconductive layer and an insulating layer dyed in a desired color for providing a color filter effect. Such photosensitive members having different color filter effects are provided for polychromatic reproduction on a single transferable material.

This invention generally relates to electronic photography, and more particularly to an improved method of and an improved apparatus for electronic color photography, as well as a photosensitive member used therewith.

A known electronic color photographic method comprises a cycle including the steps of uniformly electrically charging a photosensitive member for electronic photography, exposing the photosensitive member to a color image resolved by a color filter to thereby form an electronic latent image on the photosensitive member, developing the image by a developer corresponding to the color of the color filter, and transferring the developed image onto an image transfer member to form a powder image thereon, said cycle being repeated in number corresponding to the number of resolved colors required, each of the cycles including the steps of transferring the developed image to the image transfer member and fixing the transferred image to provide a final copy.

The use of a number of systems, however, has necessarily required color filters corresponding to the number of resolved colors required during the step of exposing the photosensitive member to such colors, and this has given rise to the necessity of changing the color filter for each exposing step. This in turn has led to the complicated construction of the control system and mechanism for automatically changing the color filter, as well as to the low-speed polychromatic reproduction which is quite undesirable in view of the high speed operation required for the present-day copying machine.

The present invention contemplates to overcome the disadvantages that have existed in the prior art electronic color photography, and eliminates the need to employ such color-resolving filters and thereby achieve high-speed polychromatic reproduction of original pictures.

Broadly stated, the present invention contemplates a method of electronic photography comprising the steps of: forming an electrostatic latent image on of each of photosensitive members corresponding in number to resolved colors, each of said photosensitive members including an insulating layer superposed on a photoconductive layer, said insulating layer providing a color filter effect; visualizing said electrostatic latent image by a color developer corresponding to said insulating layer providing the color filter effect; and transferring the visualized image formed on each of said photosensitive members onto an image transfer member in succession.

The present invention is advantageously applicable to the electronic photography disclosed in the copending applications U.S. Ser. No. 563,899 as filed July 8, 1966, and U.S. Ser No. 571,538 as filed Aug. 10, 1966, the latter now abandoned, that is, the electronic photography which uses a photosensitive member having an electrically chargeable insulating layer superposed on a photoconductive layer, whereby the surface of the insulating layer is electrically charged uniformly so that electric charge of a polarity opposite the electric charge on the surface may be found at the interface between the photoconductive layer and the insulating layer or within the photoconductive layer, whereafter an original to be copied is illuminated and contemporaneously therewith the insulating layer is subjected to electric charging of a polarity opposite the previous charge or to a.c. corona discharge to thereby form on the surface of the insulating layer an electrostatic latent image due to the surface potential difference in accordance wih the light-and-dark pattern of the original, and then the photosensitive layer is illuminated with radiant rays if desired, thereby reversing the surface potential of that layer and forming an electrostatic latent image having a high degree of contrast.

According to the present invention, such a photosensitive member as employed in the foregoing electronic photography is made to have the insulating layer thereof dyed in any desired color so as to serve also as a color filter, and thus there is provided a novel photosensitive member as well as a novel method and novel apparatus for electronic color photography which can provide polychromatic reproduction, excellently representing the gradation of an original without using any color resolving filter.

It is therefore a primary objective of the present invention to provide an improved method of and an apparatus for electronic photography as well as a novel photosensitive member used therewith.

It is an other object of the present invention to provide an improved method of and an apparatus for electronic color photography as well as a photosensitive member used therewith.

It is still another object of the present invention to provide a photosensitive member for electronic photography which can also serve as a color filter.

It is yet another object of the present invention to provide a novel method of and a novel apparatus for electronic color photography which can provide polychromatic reproduction, excellently representing the gradation of an original image, as well as a novel photosensitive member used therewith.

It is a further objective of the present invention to provide a method of and an apparatus for electronic color photography which eliminate the need to use any color filter.

It is a still further objective of the present invention to provide a method of and an apparatus for electronic color photography which can achieve high-speed image reproduction, as well as a photosensitive member used therewith.

Other objects and features of the present invention will become readily apparent to those within the skill of the art when they read the following detailed description and appended claims.

The electronic photography of the above-mentioned copending applications are characterized in that the electrostatic latent image formed on the photosensitive member for electronic photography is durable for a long time and that the photosensitive member is highly sensitive so that the photoconductive layer thereof is effective for far greater repetitive use.

The invention will now be described in detail with reference to the accompanying drawings, in which.

Figure 1:
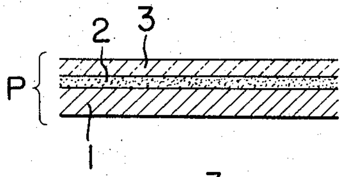
FIG. 1 is a fragmentary cross-sectional view showing an example of the photosensitive member for electronic color photography used with the present invention.

Referring to FIG. 1, the photosensitive member P for electronic color photography according to the present invention comprises a supporting member 1 formed of one or more layers, a photoconductive layer 2, and a transparent insulating layer 3 which is formed of high molecular film or the like dyed in a desired color so as to serve also as a color filter. The transparent insulating layer 3 may be formed by one of the following methods:

(1) Polyester resin colored with a dye usable with acetate is applied to the photoconductive layer 2 as by spraying or whirler. If the material in use is thermoplastic polyester, it may initially be formed into a film, which is then superposed on the photoconductive layer.

(2) A film formed of cellulose acetate having a good dyability is superposed on the photoconductive layer 2.

(3) A colored transparent film is interposed between two transparent insulating layers.

(4) A transparent insulating film is coated with a multi-layer film so as to serve as an interference filter.

Figure 2:
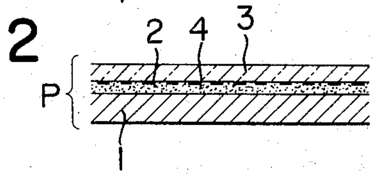
FIG. 2 is a similar view showing another example of the photosensitive member for electronic color photography used with the present invention.

As another example, the photosensitive member P may have a screen pattern formed therein so as to reproduce excellent half-tone images. Such a screen pattern may be formed by one of the following methods:

(1) As shown in FIG. 2, a screen masking 4 of an electrically conductive material or an opaque dielectric material is formed, as by printing or evaporation, on the surface of the photoconductive layer 2 which is adjacent to the transparent insulating layer 3.

Figure 3:
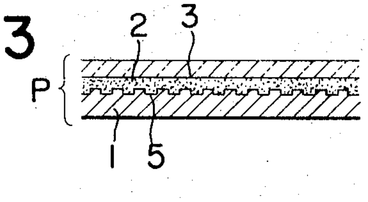
FIG. 3 is a similar view showing still another example of the photosensitive member for electronic color photography used with the present invention.

(2) As shown in FIG. 3, mosaic-like grooves 5 are formed in one surface of the supporting member 1 and the photoconductive layer 2 is superposed on that surface of the supporting member.

It has been found that the photosensitive member P having such a screen pattern formed therein provides a contrast in its electrostatic capacity $Cp$ in accordance with the thickness of the photoconductive layer 2, and that if the electrostatic capacity of the transparent insulating layer 3 is $Ci$, the contrast $A/B$ between the dark area D and light area L of the surface potential can be expressed by the following equation:

$$A/B=(Ci+Cp)/Cp$$

As seen from this equation, the contrast in the electrostatic capacity $Cp$ provides different surface potentials $A/B$ and $A/B'$ for the same dark area D, and this results in contrast which produces a sort of screen-tone effect.

Figure 4:
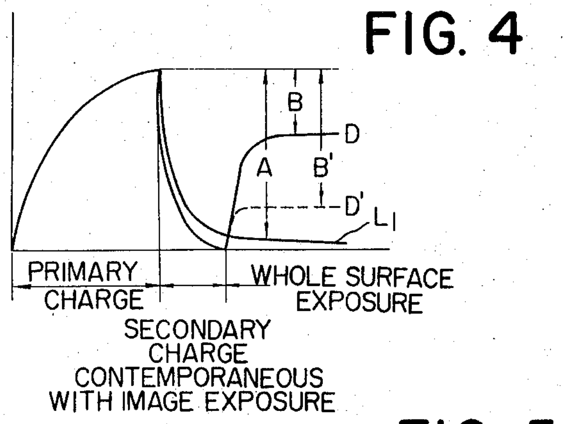
FIG. 4 is a graph for illustrating the surface potential distribution in the photosensitive member of the present invention.

The distribution of such surface potentials is shown in FIG. 4, in which letters A, B and B' respectively designate the amounts of attenuation of the primary charged voltage in the portions of the photoconductive layer which have a great thickness and a small thickness for the light and dark areas of the final electrostatic image.

For example, V-shaped grooves having a pitch of 150μ and a depth of 50μ have been formed in a mosaic-like pattern in one surface of the supporting member 1, and then resin-bonded CdS has been applied to the grooved surface of the supporting member until the layer of CdS has a thickness of 25μ as measured from the projected plane of the grooved surface of the supporting member 1. Subsequently, a polyester film as thick as 25μ has been superposed on the CdS layer to form a complete photosensitive member. Such a photosensitive member has provided an excellent half-tone reproduction of an original image formed by silver salt photography.

The supporting member 1 may be formed of a conductive metal such as tin, coper or aluminium or of hygroscopic paper. Alternatively, the supporting member 1 may be formed of paper having an aluminium foil attached thereto. The supporting member 1 may also be a multilayer one formed of a conductive layer and an insulating layer disposed one upon the other.

The photoconductive layer 2 may be formed of one material or a mixture thereof such as CdS, CdSe, amorphous Se, ZnO, ZnS, TiO, Se-Te and PbO, as by evaporation or by using epoxy resin as a binder.

With reference to FIG. 5, a description will now be made of the processes involved in the electronic color photography using the above-described photosensitive member P according to the present invention.

Figure 5A:
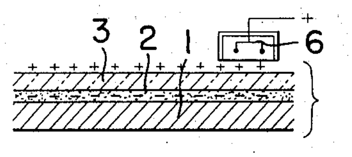
FIG. 5a to 5e illustrate the processes involved in the electronic color photography according to the present invention.

The processes take place in the following sequence:

(1) The surface of the photosensitive member having a green transparent insulating layer is subjected to primary electric charging by electrically charging means 6 of the intimate-contact electrode type or of the corona discharge type (FIG. 5a). The polarity of the electric charge is selected in accordance with the characteristics of the material forming the photoconductive layer, but a positive polarity is suitable if that material is an n-type semiconductor.

Figure 5B:
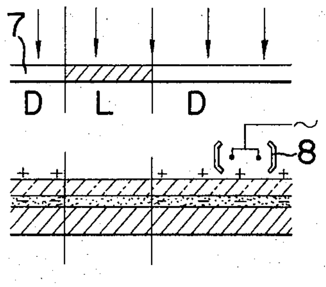

(2) An original 7 to be copied is exposed to light and contemporaneously therewith, the photosensitive member is subjected to a.c. discharge by electrically charging means 8 so as to form an electrostatic latent image corresponding to the original image having green removed therefrom (FIG. 5b).

Figure 5C:
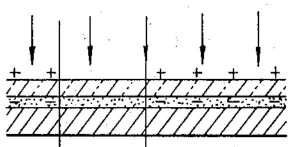

(3) The photosensitive member is fully exposed to light to increase the contrast in the latent image formed thereon (FIG. 5c).

Figure 5D:
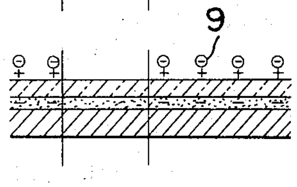

(4) The electrostatic latent image on the photosensitive member is developed by cyan toner 9 which provides a color complementary to the green transparent insulating layer 3 (FIG. 5d).

Figure 5E:
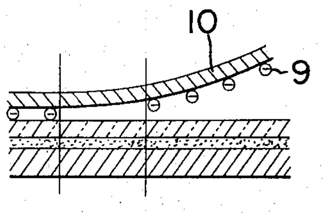

(5) The developed or visualized image in the photosensitive member is transferred onto an image transfer member 10 (FIG. 5e).

Through these five processes, the monochromatic reproduction is completed. Subsequently, the same processes as described above are repeated with a photosensitive member having a blue transparent insulating layer, and further with a photosensitive member having a red transparent insulating layer. The electrostatic images formed on the two photosensitive members are developed by magenta toner and yellow toner respectively to thereby visualize the images, which are transferred onto the same image transfer member 10 to provide a high-fidelity polychromatic reproduction of the original picture 7.

The foregoing description relates to the case of three-color resolution, whereas the present invention is not limited to the combination of such colors but applicable to all the known techniques used in the color printing art.

Figure 6:
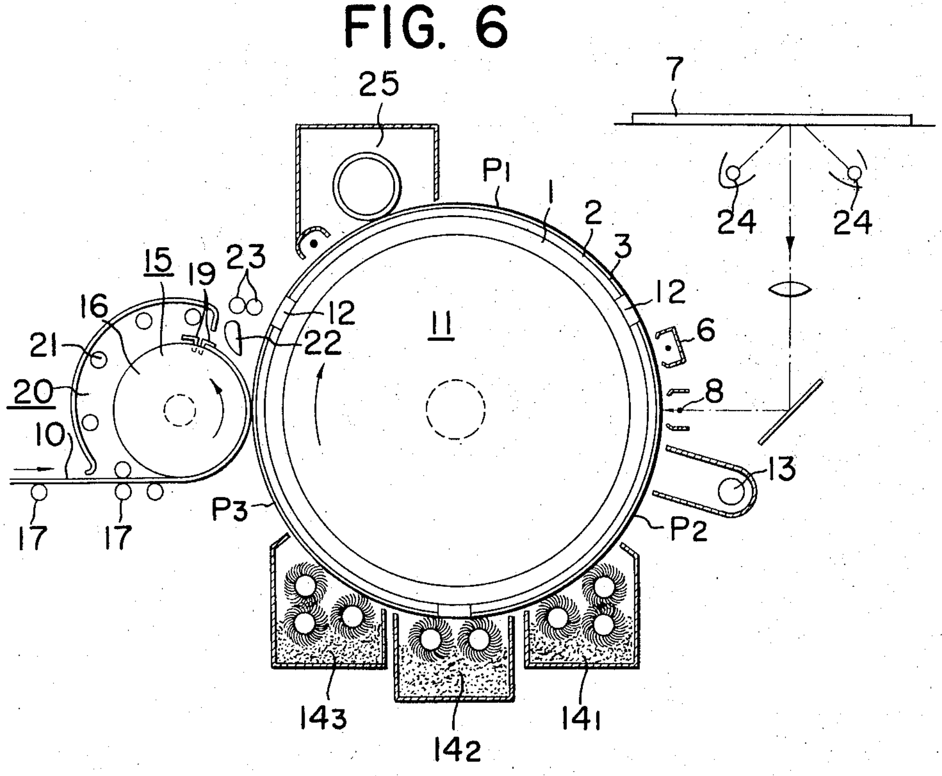
FIG. 6 is a schematic front view showing an example of the apparatus for electronic color photography according to the present invention.

FIG. 6 shows an example of the automatic color printing machine for carrying out the method of electronic color photography according to the present invention. The photosensitive member P disposed along the side wall of a rotatable drum 11 is divided into three equal segments $P_1$, $P_2$ and $P_3$ by spacers 12 formed of metal or the like. These equal photosensitive segments $P_1$, $P_2$ and $P_3$ have the transparent insulating layers thereof formed of blue, green and red transparent films of polyester, respectively. The surface of each insulating layer which is adjacent to the photoconductive layer is formed with a screen pattern as shown in FIG. 2.

Circumferentially of the drum 11 there are disposed a primary electrically charging means 6, a secondary electrically charging means 8 for effecting electric charging contemporaneously with exposure, an illuminator 13 for effecting full exposure, developing means $14_1$, $14_2$ and $14_3$ using yellow toner, magenta toner and cyan toner respectively, an image transfer station 15 and a cleaning means 25.

The image transfer station 15 has a drum 16 whose diameter is about one-third of that of the drum 11 and which is juxtaposed in side-by-side relationship with the drum 11. The image transfer member 10 such as paper in sheet form or the like is fed to the drum 16 by rolls 17 and taken up on the drum 16 by means of a pawl 19. A fixing portion 20 is provided partially circumferentially of the image transfer portion 15. The fixing portion 20 is provided with heaters 21 to preheat the drum 16 which in turn transfers the heat from the heaters to the image transfer member 10 so as to minimize the possible dilation of the image transfer member 10 during the heat fixing process. The fixing process should preferably be effected at a relatively low temperature rather than at a sharply increased high temperature so as to minimize the dilation of the image transfer member 10. For this purpose, the heaters 21 are spaced apart a sufficient distance from the periphery of the image transfer portion 15.

The drum 11 makes one-third of a rotation for one rotation of the drum 16, so that each of the photosensitive segments $P_1$, $P_2$ and $P_3$ effects the processes (1) to (5) described above. Thus, three full rotations of the drum 16, that is, one full rotation of the drum 11, provides a complete three-color printing of the original image. For this purpose, the photosensitive segments $P_1$, $P_2$ and $P_3$ are moved in synchronism with the developing means $14_1$, $14_2$ and $14_3$ respectively so that no mismatching occurs between the colors transferred from the drum 11 to the photosensitive member on the drum 16. Reference numerals 22 and 23 denote means for taking off the image transfer member 10, and numeral 24 designates a lamp for illuminating the original picture 7.

According to the present invention, as described above, the photosensitive member for electronic color photography is formed of a supporting member, a photoconductive layer and a transparent insulating layer providing a color filter effect, disposed in superposed relationship with each other, and a number of such photosensitive members are prepared corresponding to that of the resolved colors in use. The latent images formed on the surfaces of the respective insulating layers are developed by the toners providing different colors complementary to the color filters or insulating layers, whereafter these different-colored images are transferred onto the same image transfer member in superposed relationship with each other. Thus, the present invention can provide high-speed polychromatic image reproduction without the necessity of using a separate color resolving filter. Also, the screen pattern formed in the photosensitive member ensures the provision of a polychromatic image reproduction which is excellent in representing the gradation of the original picture.

What is claimed is:

1. A method of electrophotographically reproducing a color image on an image transfer member comprising
(a) projecting said color image onto each of a plurality of photosensitive members corresponding in number to the number of color separation images into which said color image is resolved, said photosensitive members each including a photoconductive layer and a superposed insulating layer which has a color filter effect and forms a different color separation image of said color image,
(b) filtering said color image at each of said photosensitive members by passing same through the superposed insulating layer and exposing the photoconductive layer to a color separation image of said color image whereby each of said photosensitive members is activated by a different color separation image,
(c) forming an electrostatic latent image on each of said photosensitive members corresponding to the activating color separation image,
(d) visualing said electrostatic latent image on each of said photosensitive members by applying a color developer corresponding to the color filter effect of the insulating layer thereof, and
(e) transferring in succession the visualized image formed on each of said photosensitive members onto said image transfer member.

2. A method of electronic photography as defined in Claim 1, wherein the step of forming an electrostatic latent image on each of photosensitive members includes the sub-steps of:
subjecting the surface of the insulating layer of each photosensitive member to primary electric charging; and
subjecting the surface of said insulating layer to electric charging of a polarity opposite to said primary electric charging and contemporaneously therewith exposing said color image onto said insulating layer.

3. A method of electronic photography as defined in Claim 1, wherein the step of forming an electrostatic latent image on each of photosensitive members includes the sub-steps of:
subjecting the surface of the insulating layer of each photosensitive member to primary electric charging; and
subjecting the surface of said insulating layer to a.c. corona discharge and contemporaneously therewith exposing said color image onto said insulating layer.

4. A method of electronic photography as defined in Claim 1, wherein the step of forming an electrostatic latent image on each of photosensitive members includes the sub-steps of:
subjecting the surface of the insulating layer of each photosensitive member to primary electric charging;
subjecting the surface of said insulating layer to electric charging of a polarity opposite said primary electric charging and contemporaneously therewith exposing said color image onto said insulating layer; and
uniformly illuminating said photoconductive layer of said photosensitive member with radiant rays.

5. A method of electronic photography as defined in Claim 1, wherein the step of forming an electrostatic latent image on each of photosensitive members includes the sub-steps of:
subjecting the surface of the insulating layer of each photosensitive member to primary electric charging;
subjecting the surface of said insulating layer to a.c. corona discharge and contemporaneously therewith exposing said color image onto said insulating layer; and
uniformly illuminating said photoconductive layer of said photosensitive member with radiant rays.

6. A method of electrophotographically reproducing a color image on an image transfer member comprising:
(a) projecting said color image onto one segment of a drum-like photosensitive member comprising a plurality of segments corresponding in number to the number of color separation images into which said color image is resolved, each segment including a supporting substrate, a photoconductive layer and a superposed insulating layer which has a color filter effect and forms a different color separation image of said color image,
(b) filtering said color image at said one segment by passing same through the superposed insulating layer thereof and exposing the photoconductive layer to one color separation image of said color image whereby the photoconductive layer of said one segment is activated by said one color separation image,
(c) forming an electrostatic latent image on said one segment corresponding to the activating color separation image,
(d) visualizing said electrostatic latent image on said one segment by applying a color developer corresponding to the color filter effect of the insulating layer thereof, (e) repeating steps (a) through (d) with the other segments each providing a visualized latent image corresponding to different color separation images of said color image, and (f) transferring in succession and in superposed relationship the visualized images formed on the respective segments onto an image transfer member.

7. A method of electronic photography as defined in Claim 6, wherein the step of forming electrostatic latent images on said photosensitive member includes the substeps of:

subjecting the surface of each of said insulating layers to primary electric charging; and subjecting the surface of each of said insulating layers to electric charging of a polarity opposite said primary electric charging and contemporaneously therewith exposing an said color image onto said insulating layer.

8. A method of electronic photography as defined in Claim 6, wherein the step of forming electrostatic latent images on said photosensitive member includes the substeps of:

subjecting the surface of each of said insulating layers to primary electric charging; and subjecting the surface of each of said insulating layers to a.c. corona discharge and contemporaneously therewith exposing said color image onto said insulating layer.

9. A method of electronic photography as defined in Claim 6, wherein the step of forming electrostatic latent images on said photosensitive member includes the substeps of:

subjecting the surface of each of said insulating layers to primary electric charging;

subjecting the surface of each of said insulating layers to electric charging of a polarity opposite said primary electric charging and contemporaneously therewith exposing said color image onto said insulating layer; and uniformly illuminating said photoconductive layer of said photosensitive member with radiant rays.

10. A method of electronic photography as defined in Claim 6, wherein the step of forming electrostatic latent images on said photosensitive member includes the substeps of:

subjecting the surface of each of said insulating layer to primary electric charging;

subjecting the surface of each of said insulating layers to a.c. corona discharge and contemporaneously therewith exposing said color image onto said insulating layer; and uniformly illuminating said photoconductive layer of said photosensitive member with radiant rays.

11. A photosensitive member for electronic color photography, comprising:

a supporting substrate;

photoconductive layer means disposed on said supporting substrate; and at least one insulating layer disposed on said photoconductive layer means and having a color filter effect and exposing said photoconductive layer means to a color separation image.

12. A photosensitive member for electronic color photography, comprising:

a supporting substrate;

photoconductive layer means disposed on said supporting substrate and having a screen pattern formed of an electrically conductive material; and more than one transparent insulating layers disposed on said photoconductive layer, each of which has a color filter effect and exposes said photoconductive layer means to a color separation image.

13. A photosensitive member for electronic color photography, comprising:

a supporting substrate;

photoconductive layer means disposed on said supporting substrate and having a screen pattern formed of a dielectric material; and more than one insulating layers disposed on said photoconductive layer, each of which has a color filter effect and exposes said photoconductive layer means to a color separation image.

14. A photosensitive member for electronic color photography, comprising:

a supporting substrate having mosaic-like grooves formed in the upper portion thereof;

photoconductive layer means disposed on said supporting substrate and more than one transparent insulating layers disposed on said photoconductive layer, each of which has a color filter effect and exposes said photoconductive layer means to a color separation image.

References Cited

UNITED STATES PATENTS

| | | | |
|---|---|---|---|
| 3,457,070 | 7/1969 | Watanabe et al. | 96—1.5 X |
| 3,438,706 | 4/1969 | Tanaka et al. | 355—11 |
| 3,986,466 | 5/1961 | Kaprelian | 96—1 |
| 3,060,019 | 10/1962 | Johnson et al. | 96—1 |
| 3,376,133 | 4/1968 | Roteman | 96—1.2 |
| 2,599,542 | 6/1952 | Carlson | 96—1.5 |

GEORGE F. LESMES, Primary Examiner

C. E. LIPSEY, Assistant Examiner

U.S. Cl. X.R.

96—1.4, 1.5, 1.8; 117—17.5; 355—4